United States Patent Office 3,424,734
Patented Jan. 28, 1969

3,424,734
PROCESS FOR THE CATALYTIC COPOLYMERIZATION OF ETHYLENE WITH α-OLEFINES AND DIOLEFINES
Bernhard Schleimer and Heinrich Weber, Marl, Germany, assignors to Chemische Werke Huls Aktiengesellschaft, Marl, Germany, a corporation of Germany
No Drawing. Filed July 12, 1965, Ser. No. 471,429
Claims priority, application Germany, Aug. 4, 1964, C 33,567
U.S. Cl. 260—85.3      13 Claims
Int. Cl. C08f 15/02, 15/40

ABSTRACT OF THE DISCLOSURE

In copolymerizing ethylene with α-olefines and diolefines, in the presence of a mixed catalyst of metals of Groups I to III of the Periodic System or their organometallic compounds, or more particularly a vanadium compound which is soluble or solubilizable in an inert diluent, the activity and the useful life of the vanadium-containing mixed catalyst are substantially increased—and the yield and economy of the process improved, if the copolymerization is effected in the presence of (a) an azo-compound of the formula

R—N=N—R' wherein R and R' each stands for a member of the group consisting of unsubstituted and substituted alkyl, cycloalkyl and aryl groups, especially, azobenzene; or (b) a nitrogen-containing organic compound which yields an azo-compound under the employed conditions of polymerization.

This invention relates to the art of copolymerizing a hydrocarbon mixture comprising at least one α-olefine and at least one member of the group consisting of another α-olefine and diolefines.

---

The copolymerization of ethylene with α-olefines and of ethylene and/or α-olefines with diolefines in the presence of mixed catalysts of metals of Groups I to III of the Periodic System or their organometallic compounds and vanadium compounds is known.

The cost of the catalyst is of decisive importance in the economical production of such copolymers. Since the cost of vanadium compounds especially is very high, a saving of such compounds is of great importance to the profitability of the polymerization process.

It has now been found that ethylene can be copolymerized with α-olefines and diolefines in the presence of mixed catalysts of metals of Groups I to III of the Periodic System and especially their organometallic compounds and vanadium compounds in inert diluents provided that the polymerization is carried out in the presence of a compound of the general formula

R—N=N—R' in which R and R' stand for substituted or unsubstituted alkyl, cycloalkyl and aryl groups. By the addition of such compounds the activity and the useful life of the vanadium-containing mixed catalysts are substantially increased and the yield and economy of the process improved.

Ethylene can be copolymerized with α-olefines such as propylene, butene-(1), pentene-(1), hexene-(1), heptene-(1), decene-(1), dodecene-(1), allylbenzene and styrene.

Examples of diolefines that are copolymerizable with ethylene and/or α-olefines are those having two double bonds which are in end position and non-conjugated such as pentadiene-(1,4), hexadiene-(1,5), heptadiene-(1,6), octadiene-(1,7), decadiene-(1,9), and dodecadiene-(1,11); also straight chain and branched chain diolefines having one end position and one middle position non-conjugated double bonds such as hexadiene-(1,4), heptadiene-(1,5), 2-methyl-hexadiene-(1,4), 3-methyl heptadiene-(1,5) and 6-methyl-heptadiene-(1,5); also cyclic diolefines such as cyclopentadiene, di-cyclopentadiene, norbornadiene, hexyl-norbornene, 5-methylene-2-norbornene, 1-vinyl-cyclohexene-(3), divinyl-cyclohexane, cyclooctadiene-(1,5) and cyclodecadiene-(1,5), and finally also diolefines having conjugated double bonds such as isoprene, butadiene and piperylene and also multiolefines such as n-decatriene-(1,4,9).

Ethylene and/or α-olefines may be copolymerized by the process of the present invention with unsaturated ring compounds which polymerize with ring opening such as norbornene, cyclobutene and cyclopentene.

The ratio of the monomers to each other is unimportant for the carrying out of the process. In general the process is carried out with a molecular ratio of e.g. ethylene to propylene of 1 to 2. The ratio may however vary within the range from 1 to 0.1 to 1 to 10.

The diolefine is used in such an amount that in the polymer there will be from 0.2 to 20 and preferably from 1 to 6 double bonds per 1000 carbon atoms. The resulting polymers may be vulcanized by the processes used for natural rubber.

The mixed catalysts consist on the one hand of metals of Groups I to III of the Periodic System or their organometallic compounds. First of all are the aluminum compounds of the general formulae $Al(R)_3, Al(R)_2X$ and $Al(R)X_2$ in which R stands for an alkyl, alkylaryl or aryl group having up to 12 carbon atoms and X stands for chlorine, bromine or iodine.

Examples of such aluminum compounds are trimethyl-, triethyl-, trihexyl- and triphenylaluminum and the corresponding dialkylaluminum monochlorides and alkylaluminum-dichlorides. Mixtures of such compounds such as ethylaluminum sesquichloride can be used. Also aluminum hydride, e.g. in the form of lithium-aluminum hydride or sodium-aluminum hydride, either alone or in mixtures with the above named halogen-containing alkylaluminum compounds are suitable as the reducing component of the mixed catalyst. Finally aluminum-hydride-halogenides and their etherates such as aluminum-hydride-chloride-etherate, either alone or in mixtures with the above named aluminum compounds can be used.

Examples of usable organometallic compounds of the other metals of Groups I to III of the Periodic System are zinc diethyl, lithium butyl and mixtures thereof.

The mixed catalysts contain, on the other hand vanadium compounds that are soluble in the diluent used in the polymerization. Examples are the vanadium salts of organic acids such as the acetate, butyrate, stearate, octoate and naphthenate of vanadium and especially the complex compounds such as vanadium-(III)-acetylacetonate, vanadium-(III)-acetylacetonate, vanadium-(III) - benzoylacetonate and the cyclopentadienyl- and indenyl vanadium. Also one may use compounds such as vanadium-(V)-oxychloride and vanadium-(IV)-chloride that are miscible with the diluent used, generally hydrocarbons and chlorohydrocarbons containing from 4 to 12 carbon atoms. Also inorganic salts of vanadium such as the halogenides, vanadium-(III)-chloride, vanadium-(II)-chloride and vanadium-(V)-chloride which are not soluble in the diluent used are usable provided that they are rendered soluble in said diluent by means of primary, secondary or tertiary aliphatic or aromatic, saturated or unsaturated alcohols such as butylalcohol, benzylalcohol, allylalcohol and furfurylalcohol or primary, secondary or tertiary amines such as butylamine, aniline, triethylamine, benzylamine or pyridine, or ethers such as dibutylether, diphenylether, anisol, dioxan and tetrahydrofuran or saturated or unsaturated carboxylic acid esters or ketones such as acetophenone. The named compounds used to make these inorganic vanadium compounds soluble in the diluent used do not exert any influence upon the activity of the catalyst and only a regulatable effect upon the molecular weight of the polymer. On the other hand the modification of the mixed catalyst in accordance with the invention by means of azo compounds strongly activates the copolymerization of ethylene with α-olefins and diolefines.

Examples of azo compounds coming under consideration are compounds of the general formula

in which R and R' stand for alkyl, cycloalkyl and aryl groups, especially phenyl and naphthyl groups, having from 1 to 20 carbon atoms which may be substituted by halogen or hydroxy groups or by lower alkyl, alkoxy, aryl or aryloxy groups containing from 1 to 10 carbon atoms. Examples are azobenzene, azotoluene, azo-chlorbenzene, azo-methoxybenzene, azo-diphenyl, azo-napthhalene and phenylazostilbene. In addition to the compounds named compounds may be used which give azo compounds under the polymerization conditions employed. Thus azobenzene and substituted azobenzenes are formed from azoxybenzene, substituted azoxybenzenes, nitrosobenzene, substituted nitrosobenzenes, nitrobenzene, substituted nitrobenzenes, phenylhydroxyl amine and substituted phenylhydroxylamines with organometallic compounds present in the described mixed catalysts.

Besides such azo compounds of the general formula

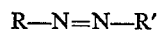

in which R and R' may be alkyl, cycloalkyl or aryl groups as described above and which are substituted by nitroso-, nitro- and hydroxylamine groups belong to the claimed group of compounds.

Furthermore five and six membered aromatic ring systems containing the —N=N— grouping and their derivatives such as 1,2,4,5-tetrazine, 1,2,4-triazine, 1,2,3-triazoline, 1,2,3-triazol and tetrazol, as well as cyclic arylazo compounds such as benzocinnoline of the formula

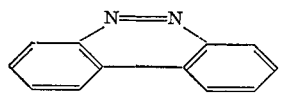

and their derivatives and also the bisazo compounds e.g. of the formula

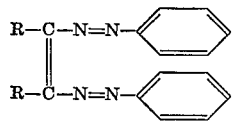

and compounds of the formula

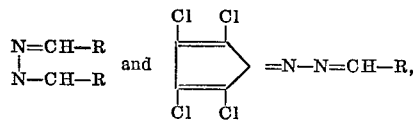

wherein R is a member selected from the group consisting of hydrogen, alkyl- and aryl groups, can be used.

Aliphatic, cycloaliphatic and aromatic hydrocarbons such as butane, pentane, hexane, cyclohexane, isopropyl cyclohexane, benzine fractions, benzene and toluene are suitable for use as inert diluents. Mixtures of these hydrocarbons can be used. Chlorinated hydrocarbons such as tetrachloroethylene and chlorobenzene are also suitable for use.

The inert diluents are used in amounts within the range from 1 to 100 times and preferably within the range from 5 to 10 times and generally about 10 times the amount of the monomers.

The organometallic compounds, preferably the aluminum-organic compounds are used in amounts within the range from 0.5 to 0.0001 and preferably from 0.05 to 0.001 mol per 100 g. of the monomers.

The molecular ratio of vanadium compound to organometallic compound, preferably aluminum organic compound should be within the range from 0.0005:1 to 1:1 and preferably within the range from 0.002:1 to 0.25:1.

The molecular ratio of azo compound, preferably azobenzene to the organometallic compound should be within the range from 0.0001:1 to 1:1 and preferably from 0.001:1 to 0.1:1.

The copolymerization takes place at temperatures between —30 and 100° C. and preferably from 0 to 50° C. and usually is carried out at room temperature.

The polymerization can be carried out at atmospheric or at higher or lower pressure. In general a pressure above atmospheric pressure is not necessary. The polymerization can be carried out discontinuously but continuous operation is especially advantageous.

The polymerization reaction mixture is worked up in the known manner by decomposing the mixed catalyst with an alcohol, ketone or complex former and expelling the diluent with steam. The catalyst residue is then separated by washing the polymer with e.g. water or an alcohol such as methanol to which, if necessary, a base or acid or complex former may be added. This may also be precipitated out of the reaction solution by means of an alcohol or ketone e.g. methanol or acetone. The polymer finally is dried in nitrogen under reduced pressure.

Depending upon the starting materials used saturated and unsaturated elastomers are produced having a variety of uses.

The modification of the mixed catalyst by means of azo compounds in accordance with the invention has the result that good yields of polymers are obtained with very small vanadium concentrations and a high ratio of aluminum to vanadium in the mixed catalyst. The modified mixed catalysts exhibit a demonstratably longer useful life and a higher activity.

The invention is illustrated by the following specific examples.

Example 1(a)

2.48 g. (20 mmol) of ethylaluminum sesquichloride and 0.0348 g. (0.1 mmol) of vanadium-(III)-acetylacetonate (Al:V ratio 200:1) were introduced into a 2 l. reaction vessel at room temperature, said reaction vessel being flushed with dry nitrogen to exclude atmospheric oxygen and containing 1000 ml. of isopropylhexane having a water content of 15 p.p.m. While stirring the contents of the vessel (150 r.p.m.) and maintaining a temperature of 27° C., 28 g. (1 mol) of ethylene (24.8 l.) and 84 g. (2 mol) of propylene (49.6 l.) were introduced continuously over a period of 2 hours into the reaction mixture. (758 torr/27° C.) The gas leaving the reaction vessel was measured every 15 minutes.

| | Reaction time, min. | | | | | | | |
|---|---|---|---|---|---|---|---|---|
| | 15 | 30 | 45 | 60 | 75 | 90 | 105 | 120 |
| Exhaust gas, l. | 4.5 | 10 | 20.1 | 29.9 | 39.8 | 49.8 | 59.6 | 69.4 |
| Exhaust gas, l./15 min. | 4.5 | 5.5 | 10.1 | 9.8 | 9.9 | 10.0 | 9.8 | 9.8 |

From observation of the rate of gas discharge from the vessel it is to be seen that the catalyst, after 30 minutes, has completely lost its catalytic activity (gas introduced 9.3 l. per 15 minutes, gas discharged 10.1 l. between 30 and 45 minutes).

By the addition of methanol the ethylene-propylene copolymer was precipitated. This copolymer was suction filtered and vacuum dried at 40° C. in nitrogen atmosphere. The yield was 8 g. (7.1% of the theoretical yield). The propylene content was determined by infra red analysis to be 34%. The content of isotatic polypropylene and homopolymer ethylene was less than 1%. The RSV value was 4.4.

Example 1(b)

The procedure described in Example 1(a) was repeated with the addition of 0.182 g. (1 mmol) of azobenzene to the reaction vessel.

| | Reaction time, min. | | | | | | | |
|---|---|---|---|---|---|---|---|---|
| | 15 | 30 | 45 | 60 | 75 | 90 | 105 | 120 |
| Exhaust gas, l | 2.6 | 3.3 | 4.9 | 10.0 | 17.8 | 25.7 | 34.5 | 43.5 |
| Exhaust gas, l./15 min | 2.6 | 0.7 | 1.6 | 5.1 | 7.8 | 7.9 | 8.8 | 9.0 |

From the discharge of gas from the reaction vessel it is to be concluded that the activity of the catalyst had become reduced to half of its original value after 45 minutes (gas introduced, 9.3 l. per 15 minutes; gas discharged 5.1 l. between 45 minutes and 60 minutes). The ethylene-propylene copolymer formed was precipitated by the addition of methanol and was suction filtered and vacuum dried at 40° C. in an atmosphere of nitrogen. The yield was 30 g. of ethylene-propylene copolymer (26.6% of the theoretical yield). By infra red analysis the propylene content was found to be 51%. The content of isotactic polypropylene and homopolymer ethylene was less than 1%. The RSV value was 1.8.

Example 2(a)

Example 1(a) was repeated with the only difference that the temperature was 15° C. instead of 27° C. with the following results.

| | Reaction time, min. | | | | | | | |
|---|---|---|---|---|---|---|---|---|
| | 15 | 30 | 45 | 60 | 75 | 90 | 105 | 120 |
| Exhaust gas, l | 5.6 | 11.0 | 20.1 | 30.2 | 40.4 | 50.8 | 61.0 | 71.2 |
| Exhaust gas, l./15 min | 5.6 | 5.4 | 9.1 | 10.1 | 10.2 | 10.4 | 10.2 | 10.2 |

From the data shown in the foregoing table it is to be concluded that the catalyst had lost its activity completely in 30 minutes (gas introduced 9.3 l. per 15 minutes; gas discharged 9.1 l. between 30 and 45 minutes). The yield was 1.7 g. (1.5% of the theoretical yield) of an ethylene-propylene copolymer having the RSV value of 4.1.

Example 2(b)

Example 2(a) was repeated with the only difference that 0.182 g. (1 mmol) of azobenzene was added to the mixed catalyst as in Example 1(b).

| | Reaction time, min. | | | | | | | |
|---|---|---|---|---|---|---|---|---|
| | 15 | 30 | 45 | 60 | 75 | 90 | 105 | 120 |
| Exhaust gas, l | 2.3 | 2.8 | 3.4 | 6.2 | 10.6 | 17.7 | 24.9 | 32.6 |
| Exhaust gas, l./15 min | 2.3 | 0.5 | 0.6 | 2.8 | 4.4 | 7.1 | 7.2 | 7.7 |

From the data in the foregoing table it is to be concluded that only after 60 minutes was the activity of the catalyst reduced to half of its original value. (Gas introduced approximately 9.3 l. per 15 minutes; gas discharged 4.4 l. between 60 and 75 minutes.) The yield is 52 g. (46.4% of the theoretical yield) of an ethylene-propylene copolymer. According to infra red analysis the propylene content of the product is 53%. The content of isotactic polypropylene and homopolymer ethylene in the copolymer is less than 1%. The RSV value is 1.7.

Example 3(a)

The procedure of Example 1(a) was repeated with the exception that the polymerization temperature was maintained at 0° C.

| | Reaction time, min. | | | | | | | |
|---|---|---|---|---|---|---|---|---|
| | 15 | 30 | 45 | 60 | 75 | 90 | 105 | 120 |
| Exhaust gas, l | 4.2 | 9.0 | 15.9 | 24.3 | 32.8 | 41.9 | 50.8 | 59.8 |
| Exhaust gas, l./15 min | 4.2 | 4.8 | 6.9 | 8.4 | 8.5 | 9.1 | 8.9 | 9.0 |

From the data in the foregoing table it is to be concluded that the catalyst activity was completely lost after 45 minutes (gas introduced 9.3 l. per 15 minutes; gas discharged between 45 and 60 minutes 8.4 l. The product, 2 g. (1.8% of the theoretical yield) was an ethylene-propylene copolymer having the RSV value of 5.1.

Example 3(b)

The process of Example 3(a) was repeated with the sole difference that the catalyst, as in Example 1(b) and 2(b) had an addition of 0.182 g. (1 mmol) of azobenzene.

| | Reaction time, min. | | | | | | | |
|---|---|---|---|---|---|---|---|---|
| | 15 | 30 | 45 | 60 | 75 | 90 | 105 | 120 |
| Exhaust gas, l | 3.1 | 3.7 | 4.1 | 5.5 | 8.3 | 13.7 | 19.5 | 26.7 |
| Exhaust gas, l./hr | 3.1 | 0.6 | 0.4 | 1.4 | 2.8 | 5.4 | 5.8 | 7.2 |

From the exhaust gas data shown above it is to be observed that the activity of the catalyst was reduced to one-half of its original activity only after 75 minutes (gas introduced about 9.3 l. per 15 minutes; gas discharged for 15 minutes between 75 and 90 minutes, 5.4 l.). The product was 48 g. (43% of the theoretical yield) of ethylene-propylene copolymer. According to infra red analysis it contained 57% of propylene. The content of isotactic polypropylene and homopolymer ethylene was less than 1%. The RSV value was 2.8.

Example 4(a)

2.48 g. (20 mmols) of ethylaluminum sesquichloride and 0.01735 g. (0.1 mmol) of vanadium oxychloride ($VOCl_3$), (Al/V-ratio 200:1) were introduced into a 2 l. reaction vessel while excluding atmospheric oxygen by flushing with dry nitrogen, said vessel containing 1000 ml. of isopropyl cyclohexane having a water content of 18 p.p.m. at room temperature. Then at 26° C. 28 g. (1 mol) of ethylene (24.7 l.) and 84 g. (2 mol) of propylene (49.5 l.) were introduced continuously over a period of 2 hours into the reaction mixture with constant stirring (150 r.p.m.) (756 torr/27° C.). The exhaust gas was measured for each 15 minute period.

| | Reaction time, min. | | | | | | | |
|---|---|---|---|---|---|---|---|---|
| | 15 | 30 | 45 | 60 | 75 | 90 | 105 | 120 |
| Exhaust gas, l | 2.6 | 4.3 | 10.0 | 19.5 | 29.3 | 38.6 | 48.6 | 49.2 |
| Exhaust gas, l./15 min | 2.6 | 1.7 | 5.7 | 9.5 | 9.8 | 9.3 | 10.0 | 10.6 |

From the exhaust gas data shown above it is to be observed that the activity of the catalyst had fallen to one-half of its original value in 30 minutes and after 45 minutes was practically zero (gas introduced 9.3 l. per 15 minutes; gas discharged between 30 and 45 minutes 5.7 l.; gas discharged between 45 and 60 minutes 9.5 l.). The copolymer was precipitated by the addition of methanol, washed twice with 500 ml. lots of methanol and vacuum dried under nitrogen at 40° C. The resulting product was 19 g. (16.9% of the theoretical yield) of ethylene-propylene copolymer. According to infra red analysis it contained 44% of propylene. The content of isotactic polypropylene and homopolymer ethylene was less than 1%. The RSV value was 3.7.

Example 4(b)

Example 4(a) was repeated with the sole difference that the catalyst was modified by the addition of 0.182 g. (1 mmol) of azobenzene.

| | Reaction time, min. | | | | | | | |
|---|---|---|---|---|---|---|---|---|
| | 15 | 30 | 45 | 60 | 75 | 90 | 105 | 120 |
| Exhaust gas, l | 2.7 | 3.4 | 5.1 | 10.0 | 17.5 | 25.8 | 34.5 | 44.3 |
| Exhaust gas, l./15 min | 2.7 | 0.7 | 1.7 | 4.9 | 7.5 | 8.3 | 8.7 | 9.8 |

From the above data it is to be seen that the activity of the catalyst fell to one-half of its original value in 45 minutes and to zero after 75 minutes (gas introduced about 9.3 l. per 15 minutes; gas discharged 4.9 l. between 45 and 60 minutes and 7.5 l. between 60 and 75 minutes). The product was 28 g. (25% of the theoretical yield) of ethylene-propylene copolymer. According to infra red analysis it contained 50% of propylene. The content of isotactic polypropylene and homopolymer ethylene was less than 1% by weight. The RSV value was 1.5.

Example 5(a)

A 2 l. reaction vessel was charged with 1000 ml. of isopropylhexane containing 20 p.p.m. of water under exclusion of atmospheric oxygen. Then, while flushing with dry nitrogen and at room temperature 2.48 g. (20 mmols) of ethylaluminum sesquichloride and 0.0480 g. (0.1 mmol) of vanadium (III)-octoate (Al to V ratio 200:1) were introduced. Then at 0° C. and with stirring (150 r.p.m.) 28 g. (1 mol) of ethylene (24.8 l.) and 84 g. (2 mol) of propylene (49.6 l.) were introduced continuously over a period of 2 hours into the reaction mixture. (758 torr/27° C.) The gas discharged was measured for each 15 minutes.

| | Reaction time, min. | | | | | | | |
|---|---|---|---|---|---|---|---|---|
| | 15 | 30 | 45 | 60 | 75 | 90 | 105 | 120 |
| Exhaust gas, l | 4.3 | 6.4 | 11.7 | 17.9 | 27.3 | 37.1 | 46.7 | 56.3 |
| Exhaust gas, l./15 min | 4.3 | 2.1 | 5.3 | 6.2 | 9.4 | 9.8 | 9.6 | 9.6 |

From the above data it appears that the catalyst had lost half of its original activity in 30 minutes and completely in 60 minutes (gas introduced 9.3 l. per 15 minutes; gas discharged 5.3 l. between 30 and 45 minutes). The ethylene-propylene copolymer was precipitated by the addition of methanol, vacuum filtered and vacuum dried at 40° C. under nitrogen. The product was 10 g. (8.9% of the theoretical yield). According to infra red analysis it contained 39% of propylene. The content of isotactic polypropylene and homopolymer ethylene was less than 1%. The RSV value was 8.0.

Example 5(b)

The process of Example 5(a) was repeated with the difference that 0.182 g. (1 mmol) of azobenzene was added to the catalyst.

| | Reaction time, min. | | | | | | | |
|---|---|---|---|---|---|---|---|---|
| | 15 | 30 | 45 | 60 | 75 | 90 | 105 | 120 |
| Exhaust gas, l | 2.6 | 2.8 | 3.3 | 4.8 | 6.7 | 12.5 | 19.5 | 26.2 |
| Exhaust gas, l./15 min | 2.6 | 0.2 | 0.5 | 1.5 | 1.9 | 5.8 | 7.0 | 6.7 |

From the foregoing data it appears that the catalyst lost half of its original activity in 75 minutes (gas introduced 9.3 l. per 15 minutes; gas discharged between 75 and 90 minutes, 5.8 l.). 61 g. (54.5% of the theoretical yield) of ethylene-propylene copolymer was recovered. According to infra red analysis it contained 64% of propylene. The contents of isotactic polypropylene and homopolymer ethylene was less than 1%. The RSV value was 2.2.

Example 6(a)

The process of Example 5(a) was repeated with the sole difference that 2.41 g. (20 mmols) of diethylaluminum chloride was substituted for the 2.48 g. (20 mmols) of ethylaluminum sesquichloride.

| | Reaction time, min. | | | | | | | |
|---|---|---|---|---|---|---|---|---|
| | 15 | 20 | 45 | 60 | 75 | 90 | 105 | 120 |
| Exhaust gas, l | 2.1 | 2.9 | 5.2 | 10.0 | 15.1 | 23.4 | 32.1 | 40.9 |
| Exhaust gas, l./hr | 2.1 | 0.8 | 2.3 | 4.8 | 5.1 | 8.3 | 8.7 | 8.8 |

From the above data it appears that the activity of the catalyst fell to half after 45 minutes and to zero after 75 minutes (gas introduced 9.3 l. per 15 minutes; gas discharged between 45 and 60 minutes 4.8 l., gas discharged between 75 and 90 minutes 8.3 l.). 22.0 g. (19.6% of the theoretical yield) of ethylene-propylene copolymer was recovered. According to infra red analysis the propylene content was 41%. The content of isotactic polypropylene and homopolymer ethylene was less than 1%. The RSV value was 3.7.

Example 6(b)

The process of Example 6(a) was repeated with the sole difference that 0.182 g. (1 mmol) of azobenzene was added to the catalyst.

| | Reaction time, min. | | | | | | | |
|---|---|---|---|---|---|---|---|---|
| | 15 | 30 | 45 | 60 | 75 | 90 | 105 | 120 |
| Exhaust gas, l | 1.9 | 2.6 | 3.6 | 4.9 | 7.7 | 11.3 | 19.1 | 26.2 |
| Exhaust gas, l./15 min | 1.9 | 0.7 | 1.0 | 1.3 | 2.8 | 5.6 | 5.8 | 7.1 |

From the data given above it is to be seen that the catalyst had lost only half of its activity after 75 minutes (gas introduced 9.3 l. per 15 minutes; gas discharged between 75 and 90 minutes, 5.6 l.). 40 g. (35.7% of the theoretical yield) of ethylene-propylene copolymer were recovered. According to infra red analysis it had a propylene content of 50% by weight. The content of isotactic polypropylene and homopolymer ethylene was less than 1% by weight. The RSV value was 1.8.

Example 7(a)

The process of Example 5(a) was repeated with the only differences that 2.54 g. (20 mmols) of ethylaluminum dichloride was substituted for 2.48 g. (20 mmols) of ethylaluminum sesquichloride and that the polymerization temperature was 30° C. instead of 0° C.

| | Reaction time, min. | | | | | | | |
|---|---|---|---|---|---|---|---|---|
| | 15 | 30 | 45 | 60 | 75 | 90 | 105 | 120 |
| Exhaust gas, l | 3.7 | 9.9 | 19.3 | 29.3 | 39.2 | 49.2 | 59.4 | 68.8 |
| Exhaust gas, l./15 min | 3.7 | 6.2 | 9.4 | 10.0 | 9.9 | 10.0 | 10.2 | 9.4 |

From the data given above it appears that the catalyst lost half of its activity after 15 minutes and completely after 30 minutes. Only 1 g. (1% of the theoretical yield) of ethylene-propylene copolymer was recovered. According to infra red analysis it had a propylene content of 41% by weight. Its content of isotactic polypropylene and homopolymer ethylene was less than 1%. The RSV value was 2.9.

Example 7(b)

Example 7(a) was repeated with the only difference that 0.182 g. (1 mmol) of azobenzene was added to the ethylaluminum dichloride: vanadium (III) octoate catalyst.

| | Reaction time, min. | | | | | | | |
|---|---|---|---|---|---|---|---|---|
| | 15 | 30 | 45 | 60 | 75 | 90 | 105 | 120 |
| Exhaust gas, l | 2.8 | 4.1 | 7.6 | 16.4 | 25.4 | 35.2 | 44.9 | 54.2 |
| Exhaust gas, l./15 min | 2.8 | 1.3 | 3.5 | 8.8 | 9.0 | 9.8 | 9.7 | 9.3 |

The data given above show that the catalyst lost its activity completely after 45 minutes. 19 g. (17% of the theoretical yield) of ethylene-propylene copolymer were recovered. Infra red analysis indicated a propylene content of 57% by weight. The content of isotactic polypropylene and homopolymer ethylene was less than 1%. The RSV value was 1.5.

Examples 8 to 11

Under the exclusion of atmospheric oxygen a 2 l. reaction vessel was charged with 1000 ml. of isopropylhexane containing 15 p.p.m. of water and while rinsing with dry nitrogen and at room temperature 2.48 g. (20 mmols) of ethylaluminum sesquichloride and 0.0348 g. (0.1 mmol) of vanadium-(III)-acetylacetonate (Al to V ratio 200:1) were introduced. Example 8 was carried out without any addition to the catalyst for comparison. In Example 9, 0.182 g. (1 mmol) of azobenzene was added to the catalyst, in Example 10, 0.107 g. (1 mmol) of nitrosobenzene was added to the catalyst and in Example 11, 0.123 g. of nitrobenzene was added to the catalyst as activator. Then in all four examples, while stirring (150 r.p.m.) and at 15° C., 28 g. (1 mol) of ethylene (24.8 l.) and 84 g. (2 mol) of propylene (49.6 l.) were introduced continuously over a period of 2 hours (758 torr/27° C.). The exit gas was determined for each 15 minutes and the reaction mixture was worked up as described in Example 1.

double bond content per 1000 carbon atoms was about 0.3. The RSV value was 1.5.

Example 13(a)

Under the exclusion of atmospheric oxygen a 2 liter reaction vessel was charged with 1000 ml. of isopropylcyclohexane containing 20 p.p.m. of water and while

TABLE

| Reaction time, min. | Example 8; exhaust gas, l. | | Example 9; exhaust gas, l. | | Example 10; exhaust gas, l. | | Example 11; exhaust gas, l. | |
|---|---|---|---|---|---|---|---|---|
| | Total | Per 15 min. | Total | Per 15 min. | Total | Per 15 min.$^2$ | Total | Per 15 min. |
| 15 | 5.1 | 5.1 | 1.8 | 1.8 | 2.5 | 2.5 | 1.9 | 1.9 |
| 30 | 11.1 | 6.0 | 2.8 | 1.0 | 3.9 | 1.4 | 3.3 | 2.4 |
| 45 | 20.4 | 9.3 | 4.2 | 1.4 | 8.1 | 4.2 | 6.5 | 3.2 |
| 60 | 29.7 | 9.3 | 8.8 | 4.6 | 14.7 | 6.6 | 14.9 | 8.4 |
| 75 | 38.9 | 9.2 | 18.1 | 9.3 | 23.6 | 8.9 | 23.8 | 8.9 |
| 90 | 48.1 | 9.2 | 27.6 | 9.5 | 32.6 | 9.0 | 33.0 | 9.2 |
| 105 | 58.1 | 10.0 | 36.2 | 8.6 | 42.0 | 9.4 | 42.5 | 9.5 |
| 120 | 68.4 | 10.3 | 45.6 | 9.4 | 50.9 | 8.9 | 51.8 | 9.3 |
| Yield, percent | 1.8 | | 33.8 | | 20.5 | | 17.8 | |
| RSV-value | 5.8 | | 2.4 | | 3.1 | | 3.5 | |
| Propylene content, weight percent | 35 | | 58 | | 43 | | 40 | |
| Homopolymer ethylene, weight percent | 1 | | 1 | | 1 | | 1 | |
| Isotactic polypropylene, weight percent | 1 | | 1 | | 1 | | 1 | |

Example 12(a)

Under the exclusion of atmospheric oxygen a 2 l. reaction vessel was charged with 1000 ml. of isopropylhexane containing 20 p.p.m. of water and while rinsing with dry nitrogen and at room temperature 2.48 g. (20 mmols) of ethylaluminum sesquichloride and 0.0348 g. (0.1 mmol) of vanadium-(III)-acetylacetonate (Al to V ratio 200:1) were introduced. Then at 30° C. 19.6 g. (0.7 mol) of ethylene (17.5 l.) and 58.8 g. (1.4 mol) of propylene (35 l.) were introduced continuously over a period of 2 hours (755 torr/25° C.) and at the same time 22.9 g. (0.28 mol) of hexadiene-(1,5) was added dropwise. The ethylene-propylene exhaust gas was measured each 15 minutes.

| | Reaction time, min. | | | | | | | |
|---|---|---|---|---|---|---|---|---|
| | 15 | 30 | 45 | 60 | 75 | 90 | 105 | 120 |
| Exhaust gas, l | 3.1 | 6.1 | 11.1 | 17.2 | 23.7 | 30.9 | 38.1 | 45.1 |
| Exhaust gas, l./15 min | 3.1 | 3.0 | 5.0 | 6.1 | 6.5 | 7.2 | 7.2 | 7.0 |

From the results shown above it is to be seen that the catalyst lost half of its activity in 15 minutes and completely in 30 minutes (gas introduced 6.6 l. per 15 minutes; gas discharged 3.0 l. between 15 and 30 minutes). The polymer formed was separated as in Example 1. It amounted to only 2.2 g. (2.2% of the theoretical yield) of the ethylene-propylene-hexadiene-1,5 copolymer.

Example 12(b)

The process of Example 12(a) was repeated with the only difference that the catalyst was modified by an addition of 0.182 g. (1 mmol) of azobenzene.

| | Reaction time, min. | | | | | | | |
|---|---|---|---|---|---|---|---|---|
| | 15 | 30 | 45 | 60 | 75 | 90 | 105 | 120 |
| Exhaust gas, l | 2.1 | 2.9 | 3.6 | 5.4 | 9.1 | 14.9 | 21.2 | 27.7 |
| Exhaust gas, l./15 min | 2.1 | 0.8 | 0.7 | 1.8 | 3.7 | 5.8 | 6.3 | 6.5 |

From the results shown in the foregoing table it is to be seen that the catalyst lost half of its activity only after 60 minutes and completely after 75 minutes (gas introduced 6.6 l. per 15 minutes; gas discharged 5.8 l. between 75 and 90 minutes). 34 g. (34% of the theoretical yield) of ethylene-propylene-hexadiene-1,5 copolymer was recovered. By infra red analysis the propylene content of the product was 45% by weight. The isotactic polypropylene and homopolymer ethylene content of the copolymer was less than 1%. The vinyl double bond content per 1000 carbon atoms was 3 and the vinylidene flushing with dry nitrogen and at room temperature 2.48 g. (20 mmols) of ethylaluminum sesquichloride and 0.0348 g. (0.1 mmol) of vanadium-(III)-acetylacetonate (Al to V ratio 200:1) were introduced. Then at 15° C., 28 g. (1 mol) of ethylene (24.8 l.) and 84 g. (2 mol) of propylene (49.6 l.) were introduced continuously over a period of 2 hours (755 torr/25° C.) and at the same time 6.6 g. (0.05 mol) of dicyclopentadiene was introduced dropwise. The ethylene-propylene exhaust gas was measured each 15 minutes.

| | Reaction time, min. | | | | | | | |
|---|---|---|---|---|---|---|---|---|
| | 15 | 30 | 45 | 60 | 75 | 90 | 105 | 120 |
| Exhaust gas, l | 3.7 | 10.1 | 18.9 | 28.1 | 37.5 | 46.9 | 56.1 | 65.2 |
| Exhaust gas, l./15 min | 3.7 | 6.4 | 8.8 | 9.2 | 9.4 | 9.4 | 9.2 | 9.1 |

From the results shown in the foregoing table it is to be seen that the catalyst lost its activity completely after 30 minutes (gas introduced 9.3 l. per 15 minutes; gas discharged 8.8 l. between 30 and 45 minutes). The resulting polymer was isolated as in Example 1(a). It amounted to only 1.0 g. (0.85% by weight of the theoretical yield) of the ethylene-propylene-dicyclopentadiene copolymer.

Example 13(b)

The process of Example 13(a) was repeated with the only difference that the catalyst was modified by the addition of 0.182 g. (1 mmol) of azobenzene. The ethylene-propylene gas mixture discharged from the reaction vessel was measured each 15 minutes.

| | Reaction time, min. | | | | | | | |
|---|---|---|---|---|---|---|---|---|
| | 15 | 30 | 45 | 60 | 75 | 90 | 105 | 120 |
| Exhaust gas, l | 2.3 | 3.4 | 5.1 | 10.1 | 18.9 | 28.1 | 37.5 | 48.3 |
| Exhaust gas, l./15 min | 2.3 | 1.1 | 1.7 | 5.0 | 8.8 | 9.2 | 9.4 | 10.8 |

From the results shown above it is to be seen that the catalyst lost half of its activity after 45 minutes and all of its activity after 60 minutes (gas introduced 9.3 l. per 15 minutes; gas discharged 8.8 l. between 60 and 75 minutes). The polymer formed was isolated as described in Example 1. 22.0 g. (18.5% by weight of the theoretical yield) of the ethylene-propylene-dicyclopentadiene copolymer was recovered. By infra red analysis the propylene content was 40% by weight. The content of isotactic polypropylene and homopolymer ethylene in the copolymer was less than 1%. The number of double bonds per 1000 carbon atoms was 8 and the RSV value was 2.1.

We claim:

1. Process which comprises copolymerizing a hydrocarbon mixture comprising at least one α-olefine and at least one member of the group consisting of other α-olefines and diolefines, in the presence of a mixed catalyst selected from the group consisting of mixtures of members of the group consisting of the metals and organometallic compounds of metals of Groups I to III of the Periodic System with vanadium compounds which are soluble or solubilizable in an inert diluent, an azo- compound of the general formula $$R-N=N-R'$$

in which R and R' each stands for a member selected from the group consisting of substituted and unsubstituted alkyl, cycloalkyl and aryl groups being present from the beginning of the reaction thereby increasing the activity and the useful life of the mixed catalyst.

2. Process as defined in claim 1 in which said one α-olefine is ethylene.

3. Process as defined in claim 1 in which said hydrocarbon mixture comprises at least two α-olefines.

4. Process as defined in claim 1 in which said hydrocarbon mixture comprises at least one diolefine.

5. Process as defined in claim 1 in which said azo compound of said general formula is azobenzene.

6. Process as defined in claim 1 in which the polymerization is carried out in the presence of a compound which liberates said azo compound of said general formula under the conditions of the polymerization.

7. Process as defined in claim 6 in which said compound is a member selected from the group consisting of azoxybenzene, nitrosobenzene and phenylhydroxylamine.

8. Process as defined in claim 1 in which the molecular ratio of said vanadium compound to said organometallic compound of a metal of Groups I to III of the Periodic System is within the range from 0.0005:1 to 1:1.

9. Process as defined in claim 1 in which the molecular ratio of said vanadium compound to said organometallic compound of a metal of Groups I to III of the Periodic System is within the range from 0.002:1 to 0.25:1.

10. Process as defined in claim 1 in which the ratio of said organometallic compound to the monomer is within the rage, from 0.5 to 0.0001 mol per 100 g. of monomer.

11. Process as defined in claim 1 in which the ratio of said organometallic compound to the monomer is within the range, from 0.5 to 0.0001 mol per 100 g. of monomer.

12. Process as defined in claim 1 in which the molecular ratio of azo compound to organometallic compound is within the range from 0.0001:1 to 1:1.

13. Process as defined in claim 1 in which the molecular ratio of azo compound to organometallic compound is within the range from 0.001:1 to .01:1.

References Cited

UNITED STATES PATENTS

| 2,977,349 | 3/1961 | Brockway et al. | 260—94.3 |
| 3,086,000 | 4/1963 | Wargotz | 260—94.3 |

JOSEPH L. SCHOFER, *Primary Examiner.*

R. A. GAITHER, *Assistant Examiner.*

U.S. Cl. X.R.

260—88.2, 80.78